United States Patent
Bartley

[11] 3,815,807
[45] June 11, 1974

[54] AUTOMATIC WELDING APPARATUS
[75] Inventor: John E. Bartley, Aptos, Calif.
[73] Assignee: Zeta International Engineering, Inc., Santa Clara, Calif.
[22] Filed: Aug. 18, 1972
[21] Appl. No.: 281,960

[52] U.S. Cl............. 228/29, 219/59, 219/124, 219/125, 228/32
[51] Int. Cl............................................. B23k 5/00
[58] Field of Search........... 228/4, 6, 25, 29, 32; 219/59, 66, 124, 125

[56] References Cited
UNITED STATES PATENTS
| | | | |
|---|---|---|---|
| 3,025,386 | 3/1962 | Machian et al. | 219/125 R |
| 3,207,408 | 9/1965 | Thome et al. | 228/29 |
| 3,688,076 | 8/1972 | Hill et al. | 219/125 R |
| 3,708,099 | 1/1973 | Nuccel | 228/32 X |

Primary Examiner—J. Spencer Overholser
Assistant Examiner—Robert J. Craig
Attorney, Agent, or Firm—Snyder, Brown and Ramik

[57] ABSTRACT

An automatic welding apparatus for cylindrical members of moderate internal diameter includes a support platform assembly carrying several bearing pads which are manually urged to radially extended positions to engage the inner surface of the cylinder and fix the platform in place. Mounted on and above the platform are a drive motor, a welding wire supply drum and a welding wire feed device. Rotatably mounted beneath the platform and centrally of it is a driven gear which is rotated by the drive motor. The driven gear mounts a carrier which through two intermediate members and a welding head support imparts a circular weld path motion to the welding head. One intermediate member is connected to the carrier for adjustment axially of the cylinder, the other intermediate member is pivotally attached to the first to vary the inclination of the welding head and the welding head support is guided on the second intermediate member for selected traversing movement back and forth relative to the weld path.

10 Claims, 11 Drawing Figures

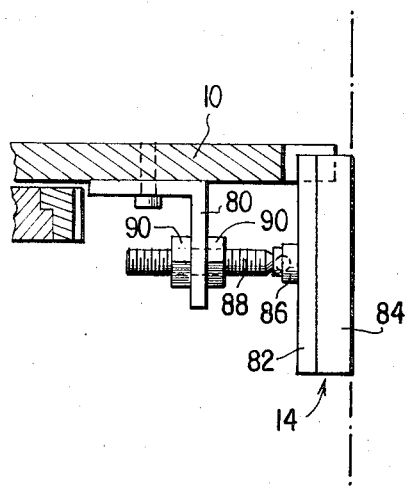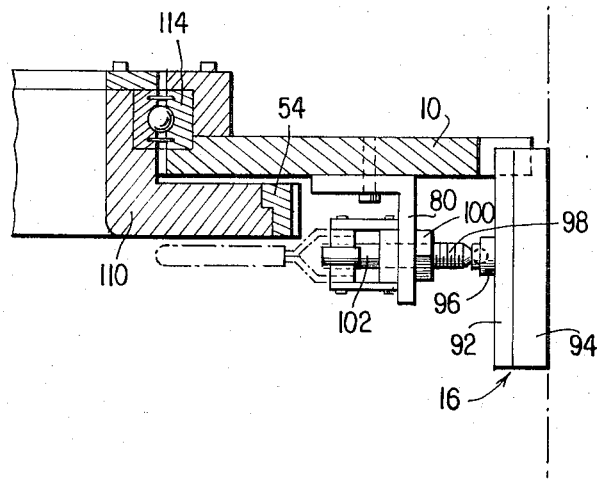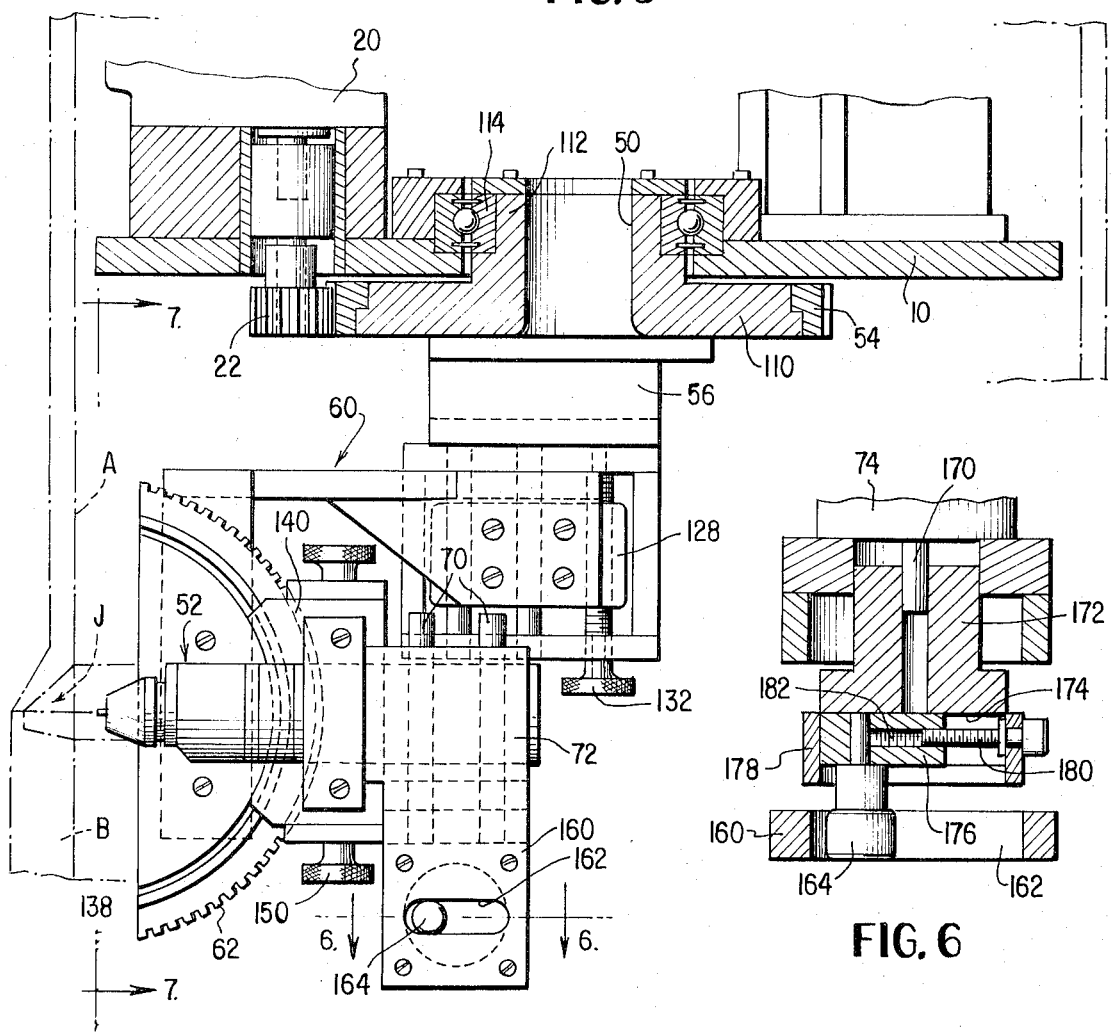

AUTOMATIC WELDING APPARATUS

BACKGROUND OF THE INVENTION

Various types of automatic welding equipment have been developed but a portable, on site automatic welding apparatus adapted to mount within a cylindrical member of moderate diameter to effect a circumferential weld thereon has not, to my knowledge, been developed.

BRIEF SUMMARY OF THE INVENTION

Accordingly, it is of primary concern in connection with the present invention to provide a portable, on site welding apparatus capable of automatic operation and adapted to be disposed within a cylindrical member of moderate diameter to effect a circumferential weld pass thereon. Briefly stated, the present invention encompasses a platform provided with radially extendible feet or pads which are adapted to be projected radially outwardly into bearing and supporting engagement against the inner surface of a cylindrical member. The platform carries a drive motor for effecting the requisite movement of the welding head and for this purpose, the drive pinion of the motor engages a gear on the lower side of the platform which is rotatably mounted thereon in centrally located position and which carries a welding head assembly with it during its rotation. The upper side of the platform is provided with welding wire feed and supply mechanism and the welding head assembly is capable not only of vertical or axial movement but also tilting motion to obtain the requisite and variable angularity of the welding head and, additionally, is provided with means for traversing the welding head back and forth with respect to the circumferential path along which the weld is made.

BRIEF DESCRIPTION OF THE DRAWING FIGURES

FIG. 3 is a vertical section taken through the support and illustrating one of the mounting pads, the section being taken along section line 3—3 in FIG. 2;

FIG. 4 is a vertical section taken substantially along the plane of section line 4—4 in FIG. 2 and illustrating the manually extendible pad;

FIG. 5 is a vertical section taken substantially along the plane of section line 5—5 in FIG. 2 and illustrating certain details of the mechanism;

FIG. 6 is an enlarged vertical section taken substantially along the plane of section line 6—6 in FIG. 5 illustrating the traversing mechanism;

DETAILED DESCRIPTION OF THE INVENTION

Figure 1:
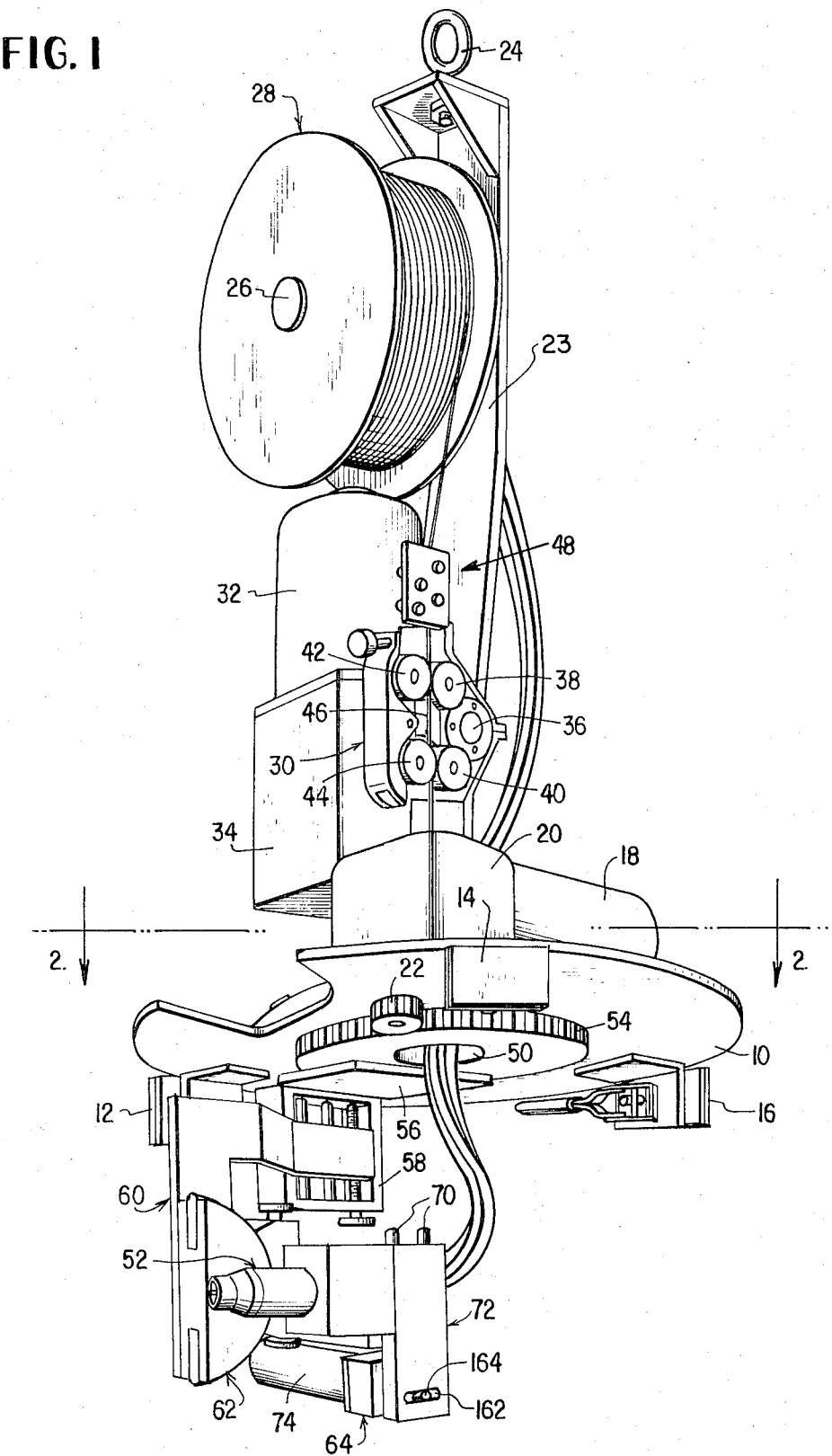
FIG. 1 is a perspective view of a preferred embodiment according to the present invention.

With reference at this time more particularly to FIG. 1, the automatic welding apparatus shown therein includes a support plate or platform 10 provided with radially adjustable supporting pads or feet 12, 14 and 16 disposed in circumferentially spaced relation therearound and by means of which as will be hereinafter more particularly apparent, the entire assemblage is supported within a cylindrical member of moderate size by the frictional engagement of these feet against the inner surface thereof.

Mounted on the upper side of the platform is a drive motor indicated by the reference character 18 and driving, through an associated gear box 20, a pinion gear 22 which is disposed below the platform, substantially as is shown. The platform 10 also mounts an upright or vertical frame member 23 which may be conveniently provided with a lifting eye 24 at its upper end as shown and which supports, through a suitable shaft 26 a spool or supply of welding wire as indicated generally by the reference character 28. The platform and upright 23 also mount a wire feeding mechanism indicated generally by the reference character 30 having an associated motor 32 and gear box 34 which, as is conventional, drives the pinion 36 which meshes with the pinions 38 and 40 which cooperate with the idler pinions 42 and 44 to feed the welding wire 46 axially. The wire feeding mechanism and its drive are entirely conventional in themselves and their details form no part of the present invention. Associated with the wire feed mechanism is a wire straightener mechanism 48 also of entirely conventional design and configuration.

The welding wire 46 issues centrally through the assembly and in particular through the access opening 50 thereof as is shown and, in addition, coolant lines, inert gas supply conduit means and welding current cable means is extended to the welding head indicated generally by the reference character 52. The welding head is of course also of entirely conventional design and configuration and its details form no part of the present invention.

The pinion 22 is in mesh with a driven gear 54 which is rotatably mounted in the platform 10 and below the same as shown and to which is affixed a carrier plate 56 and associated slide bar assembly 58. The slide bar assembly adjustably carries a first intermediate member indicated generally by the reference character 60 and which includes a gear sector arrangement indicated generally by the reference character 62 by means of which a second intermediate member indicated generally by the reference character 64 is adjustably mounted for changes in angularity with respect to the assemblage 60 about a substantially horizontal pivot axis as will hereinafter be more particularly pointed out.

The second intermediate assembly 64 includes a pair of guide rods 70 upon which is slidably received the welding head support block indicated generally by the reference character 72, the latter being movable axially along the rods 70. The second intermediae assemblage 64 carries a traversing motor 74 which in a manner more particularly pointed out hereinafter, may impart a traversing movement of the assemblage 72 back and forth along the rods 70.

Figure 2:
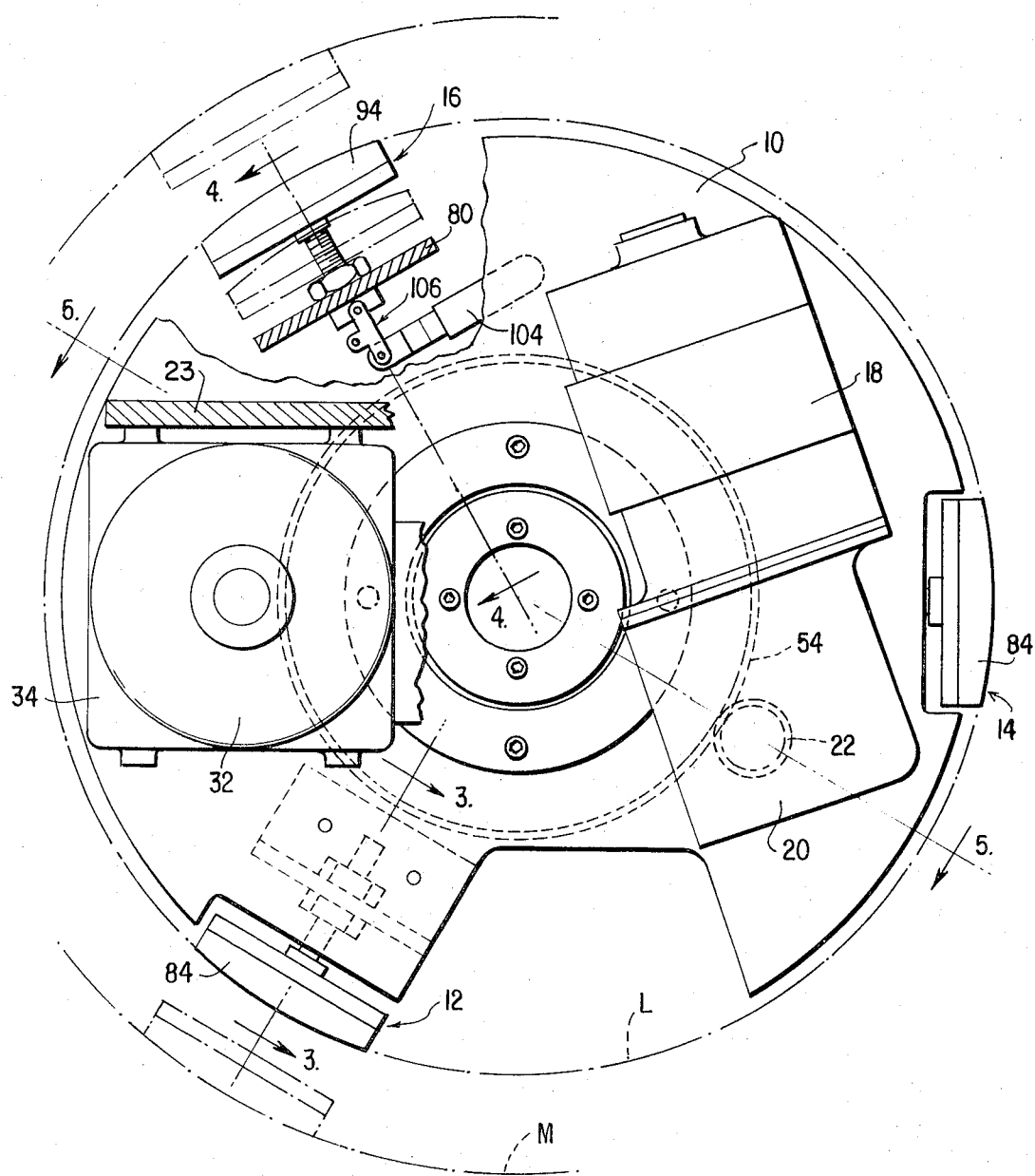
FIG. 2 is an enlarged horizontal section taken substantially along the plane of section line 2—2 in FIG. 1.

As is shown in FIGS. 2-4, the mounting pads or feet are carried by the respective bracket members 80 which are secured to the underside of the plate or platform 10. The two feet 12 and 14 each are in the form of a backing plate 82 and an outer face portion 84 of resilient material such as rubber or the like and the inner side of each backing plate 82 is provided with a ball joint connection 86 to one end of a threaded adjustment member 88 which passes through the depending portion of the bracket 80 and has a pair of nuts 90 associated therewith for radially adjusting the associated pads inwardly and outwardly radially to obtain the proper centering of the assembly with respect to the interior surface of the cylindrical member which is to be welded. The third shoe 16 likewise includes a backing plate 92 and resilient facing material 94 having a ball joint connection at 96 to the threaded member 98. The member 98 is provided with a stop nut 100 but the unthreaded shank portion 102 thereof is slidably engaged through the bracket 80. The manually operable handle 104 operates through the toggle linkage 106 to extend the pad 16. In operation, as will be seen in FIG. 2, screw thread radial adjustment of the mounting pads is effected dependent upon the particular internal diameter of the cylindrical member being welded, a minimum diameter being indicated by the chain line L and the outer extremity of the diameter being indicated by the chain line M. When the pads are approximately positioned, the handle 104 is operated to cause all of the pads to react against the inner surface of the cylindrical member to hold the platform assembly in place. Final adjustment and centering of the assembly may take place much in the fashion of a three jaw chuck as will be well understood by those in the art.

As is shown in FIG. 5, the gear 54 is formed on or attached to a hub plate 110 which is provided with an axially extending hollow spool portion 112 provided with a seat for the bearing 114 by means of which the hub is rotatably mounted in the platform 10 as is shown. The central opening 50 in the hub is for the purpose previously mentioned.

Figure 7:
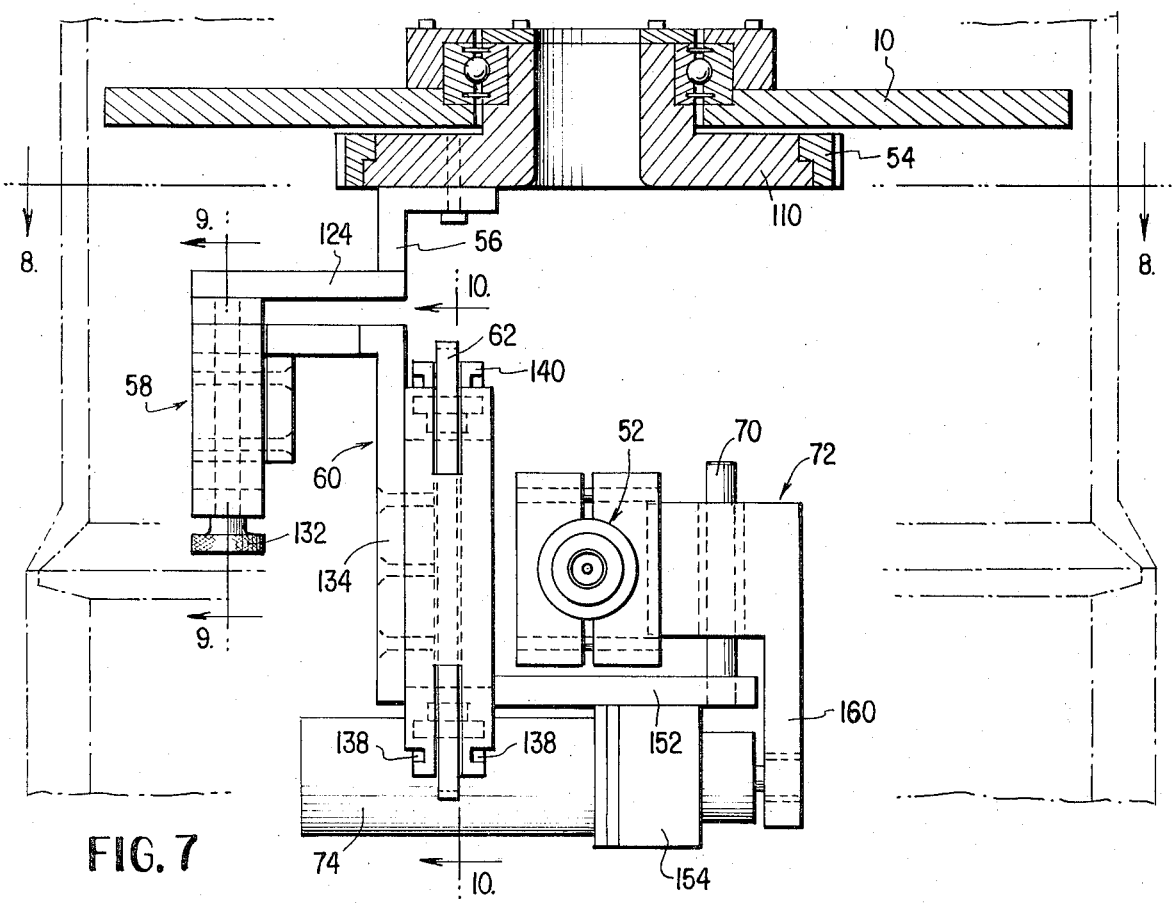
FIG. 7 is an elevational view as indicated by the section line 7—7 in FIG. 5 and illustrating further details of the welding head and carrier therefor.
Figure 8:
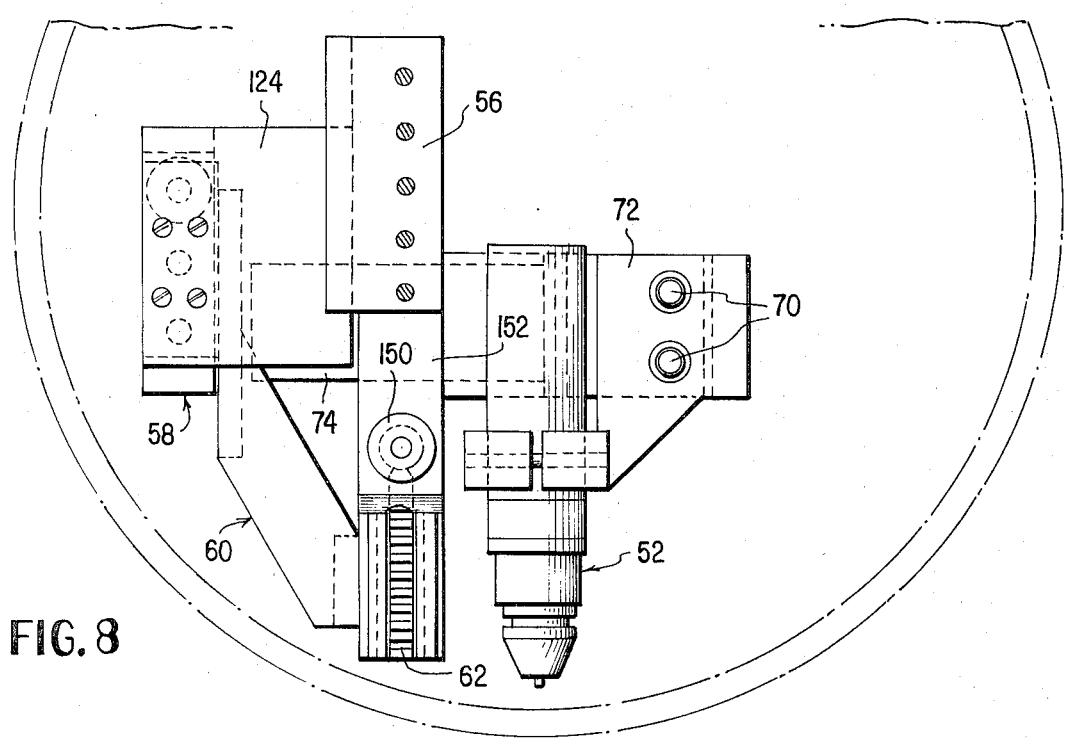
FIG. 8 is a horizontal section taken substantially along the plane of section line 8—8 in FIG. 7.
Figure 9:
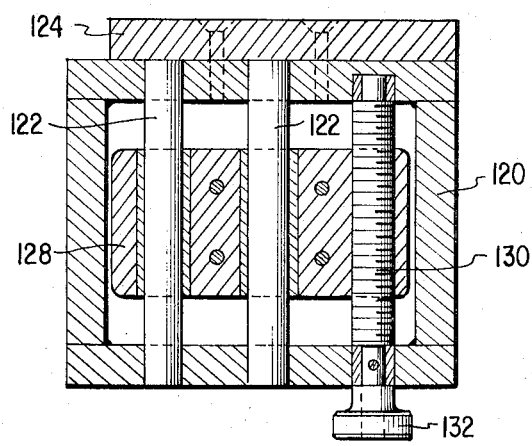
FIG. 9 is an enlarged vertical section taken substantially along the plane of section line 9—9 in FIG. 7 illustrating certain details of the slide block assembly.

The bracket 56 as will be seen clearly in FIGS. 5 and 7 is radially offset on the hub 110 to carry the slide block assembly 58 in a relatively wide arc. The slide block assembly as is shown in FIG. 9 includes the frame 120 and a pair of slide rods or bars 122, the frame 120 depending vertically downwardly from the horizontal arm portion 124 of the bracket assembly 56. A slide block 128 is slidably engaged on the bars or rods 122 and is provided with an internally threaded through bore within which a lead screw member 130 is engaged, the lead screw member being carried by the frame 120 so as to prevent axial displacement of the lead screw with respect thereto but to permit the requisite rotation thereof. A hand knob 132 is secured to the lead screw 130 so that by manual rotation thereof, the block 128 may be moved vertically up and down to carry with it the aforesaid first intermediate assembly 60 which is attached to and carried by the block 128.

Figure 10:
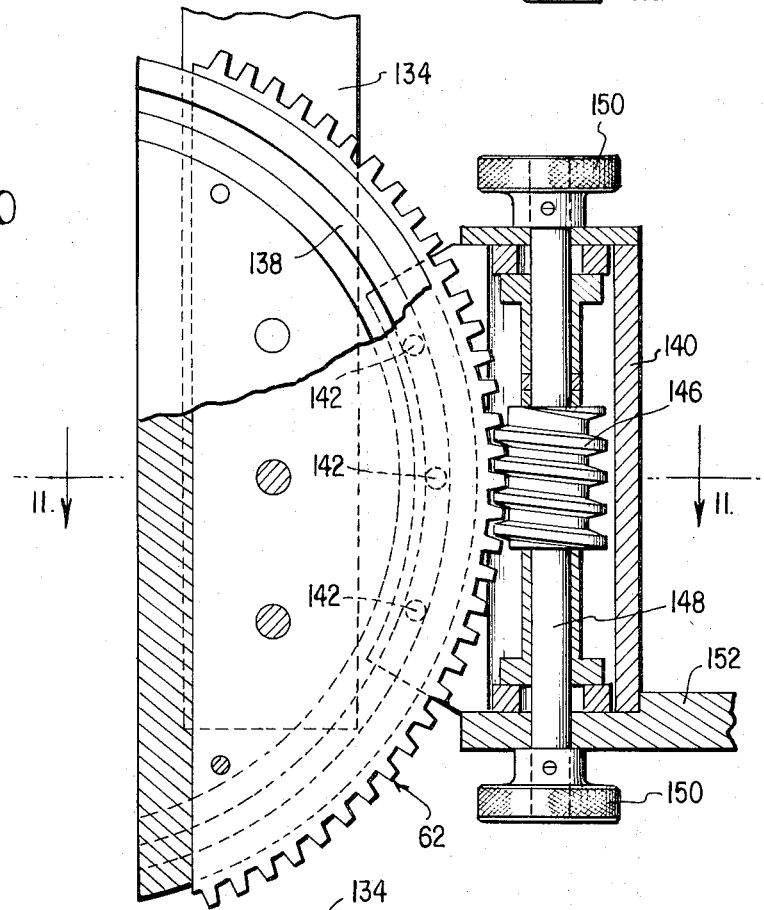
FIG. 10 is a vertical section, enlarged, illustrating the tilting mechanism as indicated by the section line 10—10 in FIG. 7.
Figure 11:
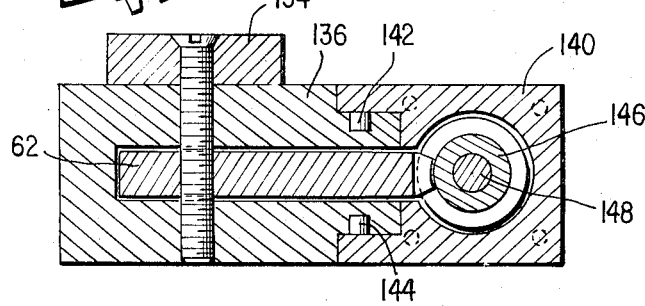
FIG. 11 is a transverse section taken substantially along the plane of section line 11—11 in FIG. 10.

The first intermediate member or assembly 60 has a depending vertical leg portion 134 and to its inner side there is secured a housing 136 as is indicated more clearly in FIG. 11. The housing 136 is provided with a recess receiving the aforementioned gear sector 62 and the opposite sides of the housing 136 are provided with arcuate guide slots 138 as may be seen more clearly in FIGS. 10 and 11. A housing member 140 is provided with a plurality of pins on either side engaging in the slot 138, the pins being indicated by the reference characters 142 and 144 in FIGS. 10 and 11. The housing 140 houses a worm 146 mounted on the shaft 148 which is rotatably supported by the housing but fixed against longitudinal movement with respect thereto as will be seen. The opposite ends of the shaft 148 are provided with the hand knobs 160 by means of which the worm 146 may be turned to cause the housing 140 to move along the gear sector 62, as will be evident.

The housing 140 is fixed to a horizontal arm 152 which, together with the housing 140, forms the second intermediate member and which is tiltable as aforesaid with respect to the first intermediate member. A mounting block portion 154 is secured to the underside of the horizontal arm portion 152 and serves to mount the aforementioned traversing motor 74. On the upper side of the arm portion 152 are the guide bars 70 previously mentioned upon which is slidably engaged the welding head support 72. The depending body portion 160 of the welding head support is provided with an elongate slot 162 within which an eccentric cam member 164 is movable to impart the requisite up and down motion of the support 72 as imparted thereto by the drive motor 74.

As illustrated in FIG. 6, the output shaft 170 of the drive motor 74 is fixed to a coupling member 172 having in its lower extremity a transverse T slot 174 receiving the slide block 176. Surrounding and secured to the lower end of the coupling member 172 is a sleeve 178 which carries a screw threaded adjusting member 180 which is received in the threaded bore 182 of the block 176. By adjustment of the member 180, the block 176 is movable back and forth in the T slot 174 to the desired position so as to effect the desired offset or eccentricity for the cam member 164 which operates in the elongate slot 162 of the member 160. Thus, the requisite traversing stroke is achieved by adjustment of the member 180.

As can be seen more clearly in FIG. 5, the angular or tilt movement of the assemblage is such as is centered reasonably close to the welding arc or in general close to the weldment being made. In FIG. 5, the assemblage is being utilized to effect a weld at the joint J between the two cylindrical members A and B. It will be appreciated that the tilting mechanism is adjusted to achieve the requisite angularity of the welding head whereas the slide block arrangement 58 is utilized to achieve the proper depth in the axial direction whereas the eccentric adjustment for the cam 164 is set to achieve the requisite traversing stroke.

I claim:

1. An automatic welding apparatus comprising, in combination:

a support platform assembly adapted to be positioned within a cylindrical member to be welded and including pressure foot means for radial movement into bearing relation with the inner surface of such member;

driven gear means rotatably supported centrally and on one side of said support platform assembly;

a carrier assembly secured to said driven gear means;

a first intermediate member carried by said carrier assembly for positional movement relative thereto axially of the cylindrical member;

a second intermediate member carried by said first intermediate member for pivotal movement relative thereto within a plane extending axially of the cylindrical member;

a welding head support carried by said second intermediate member;

drive means, welding wire supply means and welding wire feed means mounted on the opposite side of said support platform assembly, said drive means being connected to said driven gear means for moving the carrier assembly through a circular path, said welding wire supply means including a supply of welding wire issuing therefrom to said feed means, and said feed means engaging said welding wire for delivering welding wire to said welding head.

2. An automatic welding apparatus as defined in claim 1 including means for traversing said welding head support back and forth along a path transverse to the circular path imparted to such support by said carrier assembly so as to produce a compound motion of the welding head which is a transverse sinusoidal variation on a basic circular path.

3. An automatic welding apparatus as defined in claim 2 wherein said carrier assembly includes a slide block and guide rods therefor, and lead screw means for adjustably positioning said slide block, said first intermediate member being secured to said slide block.

4. An automatic welding apparatus as defined in claim 3 wherein said first intermediate member includes a gear sector and said second intermediate member includes a frame guided on said first intermediate member for arcuate movement about a center coincident with that of said gear sector, and a gear element carried by said frame and in mesh with said gear sector.

5. An automatic welding apparatus as defined in claim 4 wherein said center of arcuate movement is located close to the joint to be welded.

6. An automatic welding apparatus as defined in claim 1 wherein said carrier assembly includes a slide block and guide rods therefor, and lead screw means for adjustably positioning said slide block, said first intermediate member being secured to said slide block.

7. An automatic welding apparatus as defined in claim 6 wherein said first intermediate member includes a gear sector and said second intermediate member includes a frame guided on said first intermediate member for arcuate movement about a center coincident with that of said gear sector, and a gear element carried by said frame and in mesh with said gear sector.

8. An automatic welding apparatus as defined in claim 7 wherein said center of arcuate movement is located close to the joint to be welded.

9. An automatic welding apparatus as defined in claim 1 wherein said first intermediate member includes a gear sector and said second intermediate member includes a frame guided on said first intermediate member for arcuate movement about a center coincident with that of said gear sector, and a gear element carried by said frame and in mesh wth said gear sector.

10. An automatic welding apparatus as defined in claim 9 wherein said center of arcuate movement is located close to the joint to be welded.

* * * * *